(12) United States Patent
Hutchings et al.

(10) Patent No.: US 8,493,600 B2
(45) Date of Patent: Jul. 23, 2013

(54) MULTI-LAYERED PRINTER DRIVER MODEL

(75) Inventors: Justin Hutchings, Issaquah, WA (US); Anthony X. Francisco, Woodinville, WA (US); Shawn Maloney, Redmond, WA (US); Andrew Harper, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 12/968,051

(22) Filed: Dec. 14, 2010

(65) Prior Publication Data

US 2012/0147416 A1  Jun. 14, 2012

(51) Int. Cl.
G06F 3/12 (2006.01)
G06K 15/00 (2006.01)

(52) U.S. Cl.
USPC .......................................... 358/1.15; 358/1.13

(58) Field of Classification Search
USPC .... 358/1.1, 1.13, 1.14, 1.15, 1.18; 707/104.3; 709/203; 717/108, 175; 719/321
See application file for complete search history.

(56) References Cited

U.S. PATENT DOCUMENTS

| | | | |
|---|---|---|---|
| 5,926,775 A | | 7/1999 | Brumley et al. |
| 7,505,170 B2 * | | 3/2009 | Emerson et al. ............... 358/1.3 |
| 8,365,164 B1 * | | 1/2013 | Morgenstern ................. 717/175 |
| 2003/0093581 A1 | | 5/2003 | Oliver et al. |
| 2005/0028172 A1 | | 2/2005 | Yoshikawa et al. |
| 2007/0013930 A1 * | | 1/2007 | Emerson et al. ............. 358/1.13 |
| 2007/0067499 A1 | | 3/2007 | Wolfe et al. |
| 2008/0180723 A1 | | 7/2008 | Selvaraj |
| 2008/0250430 A1 | | 10/2008 | Salgado et al. |
| 2009/0063563 A1 * | | 3/2009 | Khangaonkar et al. .... 707/104.1 |
| 2009/0190150 A1 | | 7/2009 | Selvaraj et al. |
| 2009/0213395 A1 | | 8/2009 | Ozaki |

OTHER PUBLICATIONS

"Advances in High-Speed Parallel Port Performance and Port Sharing," Warp Nine Engineering, IEEE 1284.3 and 1284.4, Published Aug. 16, 2008, 2 pages http://www.fapo.com/1284adv.htm.
"International Search Report", Mailed Date: Aug. 14, 2012, Application No. PCT/US2011/064751, Filed Date: Dec. 14, 2011, pp. 8.

* cited by examiner

*Primary Examiner* — Gabriel Garcia

(57) ABSTRACT

Embodiments of the invention provide a layered printer driver model in which, at the "bottom layer," a rendering component provides rendering functionality to format information constituting a print job initiated according to a page description language that a printer device is designed to process, and one or more other components that provide configuration and/or user experience functionality may "sit atop" the bottom layer. Any or all of these higher-level components may support not just a single printer device, but a class of printer devices defined by one or more shared characteristics.

20 Claims, 5 Drawing Sheets

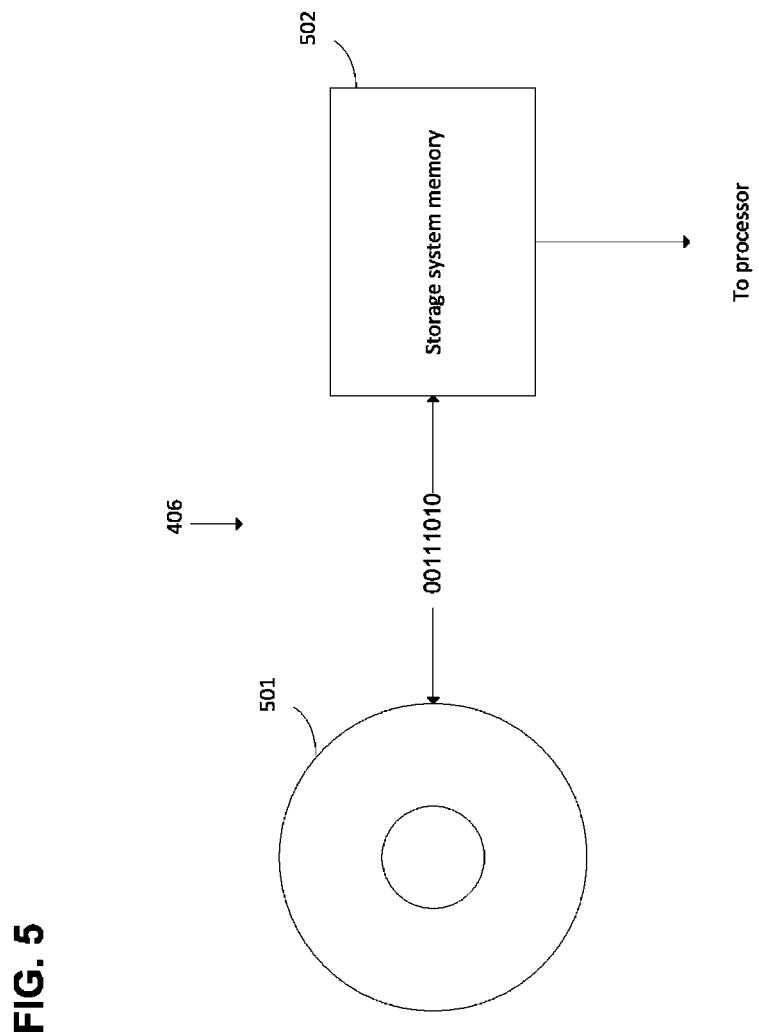

MULTI-LAYERED PRINTER DRIVER MODEL

FIELD OF THE INVENTION

This invention relates to device drivers, and more particularly to printer drivers.

BACKGROUND

A device driver is a body of software code that enables one or more higher-level computer programs to interact with a hardware device. Often, a device driver accepts generic commands from a higher-level computer program with which a user interacts, and translates the commands into lower-level commands appropriate for the device being driven. By acting as a translator between a higher-level program and the hardware device, the device driver can simplify the programming of those programs, since providing a standardized way for the programs to interface with a device can allow developers of the programs to focus on higher-level program code, and not on lower-level machine commands needed to make the device operate.

A printer driver is a body of software code that enables higher-level programs to employ a printer device. In general, a printer driver provides three main types of functionality: rendering, configuration and user experience functionality. Rendering functionality provided by a printer driver translates information that the underlying operating system generates when a print function is invoked by a higher-level computer program into commands and data that comply with a page description language (PDL) used by the printer device (e.g., PostScript, PDF, XPS, PCL5, etc.). Information generated by a printer driver in PDL form may, for example, comprise a stream of data, in text and/or binary format, to be processed by a printer device in printing information.

Configuration functionality provided by a printer driver enables the printer device to provide information relating to its configuration, such as the paper sizes it supports, the number of paper trays presently in or out, whether it supports stapling, color printing, etc. User experience functionality manages various user dialogues presented to a user via a screen display, such as options presented during print operation, etc. Often, a "default" user experience is provided by the operating system, but the feature set provided by this default is extended (e.g., by the independent hardware vendor, or IHV, that supplies the printer device), to support such goals as branding.

SUMMARY

Applicant has appreciated various deficiencies with conventional printer drivers. For example, conventional printer drivers are developed to be device-, operating system-, and architecture-specific. As a result, a particular conventional printer driver enables higher-level programs to interface with only a certain brand and model of a printer device, executes only under a certain operating system, and only under a particular processor architecture (e.g., a 32-bit architecture, 64-bit, etc.). Thus, if a user employs, as an example, a particular printer brand and model, and a computer executing a Microsoft Windows-family operating system that runs under a 64-bit architecture, a specific printer driver that was designed for that configuration is needed for the printer to interoperate with the computer. Given the proliferation of new computing devices, operating systems and architectures in the marketplace, and the general assumption on the part of the user community that new computing devices will be able to interoperate with a printer device to print information, many printer device vendors have struggled to keep pace and provide the drivers needed to support the number of different configurations in use. Perhaps as a result, printer drivers can be error-prone. Because a printer driver is often loaded into the process of a higher-level program attempting to print, the failure of a printer driver often causes the failure of the higher-level program and/or operating system. As a result, printer drivers are one of the most common causes of system failures.

Applicant has further appreciated that one reason for the deficiencies described above is the model employed by conventional printer drivers. For example, conventional printer drivers include the code that provides rendering, configuration and user experience functionality as a unitary body in which each component is commingled with and interrelated to other components. The various components use data in "helper files" provided by the print subsystem and/or with the printer driver, and each component employs specific coded references to each helper file. Thus, a conventional printer driver requires full knowledge of each helper file it employs and the entity that provides it. Any changes to the underlying operating system or the printer driver can severely impact the driver's operation. As a result, conventional printer drivers are difficult to maintain.

Some embodiments of the present invention replace this conventional printer driver model with one that is flexible and extensible. For example, some embodiments of the invention provide a printer driver model in which rendering, configuration and user experience functionality is provided by separate components, each of which may be made available by any suitable entity, including but not limited to a software vendor (e.g., the maker of an operating system under which the printer driver is designed to execute), hardware vendor (e.g., the maker of one or more printers which the printer driver is designed to drive), or other entity(ies).

Some embodiments of the invention provide a printer driver model that is both layered and modular. At the "bottom layer" of this model, a rendering component provides the rendering functionality needed to translate information generated by the operating system when printing is initiated into a format that complies with a PDL which the printer device is designed to process. The rendering component may, for example, be provided by the maker of the operating system, and be tightly integrated with (e.g., incorporated into) the print subsystem of the operating system. Other components that provide configuration and/or user experience functionality may "sit atop" this bottom layer. The rendering component may provide a standardized interface for higher-level components, and each higher-level component may take a dependency from the rendering component. Because higher-level components are functionally decoupled from the rendering component, but still capable of interoperating with the rendering component in standardized fashion, the rendering component may be modified over time without affecting the operation of the higher-level components.

As a further improvement over conventional approaches, some embodiments of the invention provide a printer driver model in which any or all of the higher-level components that provide configuration and user experience functionality may support not just a single device, but a class of devices. For example, a component may enable a foundational set of configuration features for each of a population of devices (e.g., one in which each member device includes largely the same internal parts, is configured to process the same PDL, or share one or more other characteristics or features), rather than a specific device. Given the ability for a driver component to support a population of devices, the number of driver components to be supported overall may decline, such that those driver components may become more reliable over time. In addition, providers of those driver components may focus more intently on the manner in which users interact with devices, rather than having to be concerned with translating information to a particular PDL. As a result, printer driver components may provide a richer user experience over time.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5 is a block diagram depicting an example memory on which instructions embodying aspects of the invention may be recorded.

DETAILED DESCRIPTION

Some embodiments of the present invention provide a printer driver model that is more flexible and extensible than conventional printer driver models. For example, some embodiments provide a multi-layer printer driver model in which, at the "bottom" layer, a rendering component provides rendering functionality to translate information generated by the operating system into a format that complies with a PDL which a printer device is designed to process. The rendering component may, for example, be tightly integrated with (e.g., incorporated into) the print subsystem of the underlying operating system. Any number of separate, independent components may "sit atop" this bottom layer to provide configuration and/or user experience functionality, and any one or more of these components may support not just a single device, as conventional printer drivers do, but a class of devices. The rendering component may provide a standardized interface for the higher-level configuration and/or user experience components, and the higher-level configuration and/or user experience components may employ information provided by the rendering component.

Figure 1:
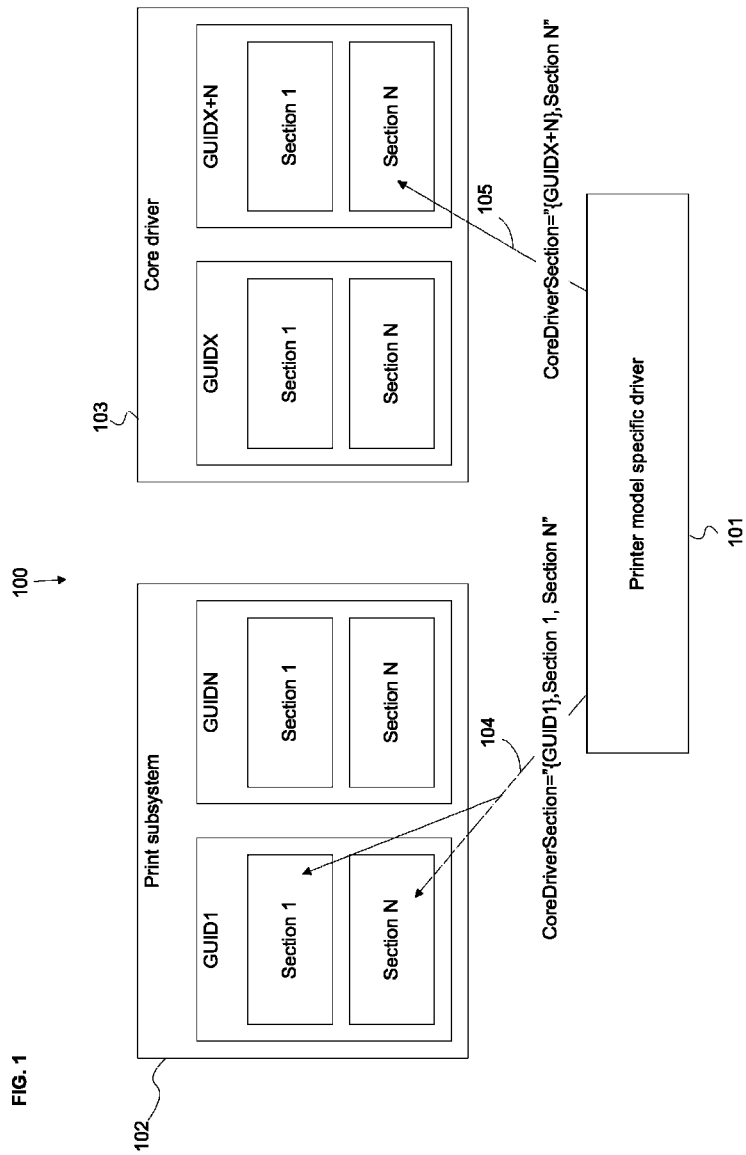
FIG. 1 is a block diagram depicting an example printer driver model, in accordance with the prior art.

To provide context, a conventional printer driver implementation 100 is depicted in FIG. 1. Specifically, FIG. 1 depicts printer model specific driver 101, which comprises a unitary body of code for providing rendering, configuration and user experience functionality. To provide this functionality, printer model specific driver 101 employs various helper files provided by the print subsystem 102, as well as helper files provided with printer model specific driver 101 (e.g., by the hardware vendor that supplies the printer, and/or another supplier). The collection of helper files provided with the driver is represented symbolically in FIG. 1 as core driver 103.

As FIG. 1 indicates, printer model specific driver 101 comprises code that includes specific references to certain helper files provided by print subsystem 102 and core driver 103. Specifically, in the example of FIG. 1, print subsystem 102 includes helper files, each indexed by a globally unique identifier (GUID). Thus, in the example shown, print subsystem 102 includes GUID1-GUIDN (although only GUID1 and GUIDN are depicted for ease of illustration), with each GUID having associated sections comprising helper files. Specifically, in the example shown, GUID1 and GUIDN each includes associated sections 1-N (although only sections 1 and N are illustrated). Similarly, core driver 103 includes GUIDX-GUIDX+N, with each GUID having associated sections comprising helper files. Specifically, in the example shown, GUIDX and GUIDX+N each includes associated sections 1-N (although only sections 1 and N are shown). The code comprising printer model specific driver 101 includes specific references 104 and 105 to sections of print subsystem 102 and core driver 103, respectively. Specifically, the code comprising printer model specific driver 101 includes specific references to GUID1, sections 1 and N provided by print subsystem 102, and to GUIDX+N, section N.

It should be appreciated that making the specific references depicted in FIG. 1 requires detailed knowledge of not only the specific helper files needed for printer driver operation, but the entity that supplies each helper file. It should further be appreciated that any changes to a helper file, supplying entity, or storage location (e.g., brought about by changes to print subsystem 102 and/or core driver 103, or some other reason (s)) can severely impact the operation of printer model specific driver 101, which can lead to the problems discussed above.

Figure 2:
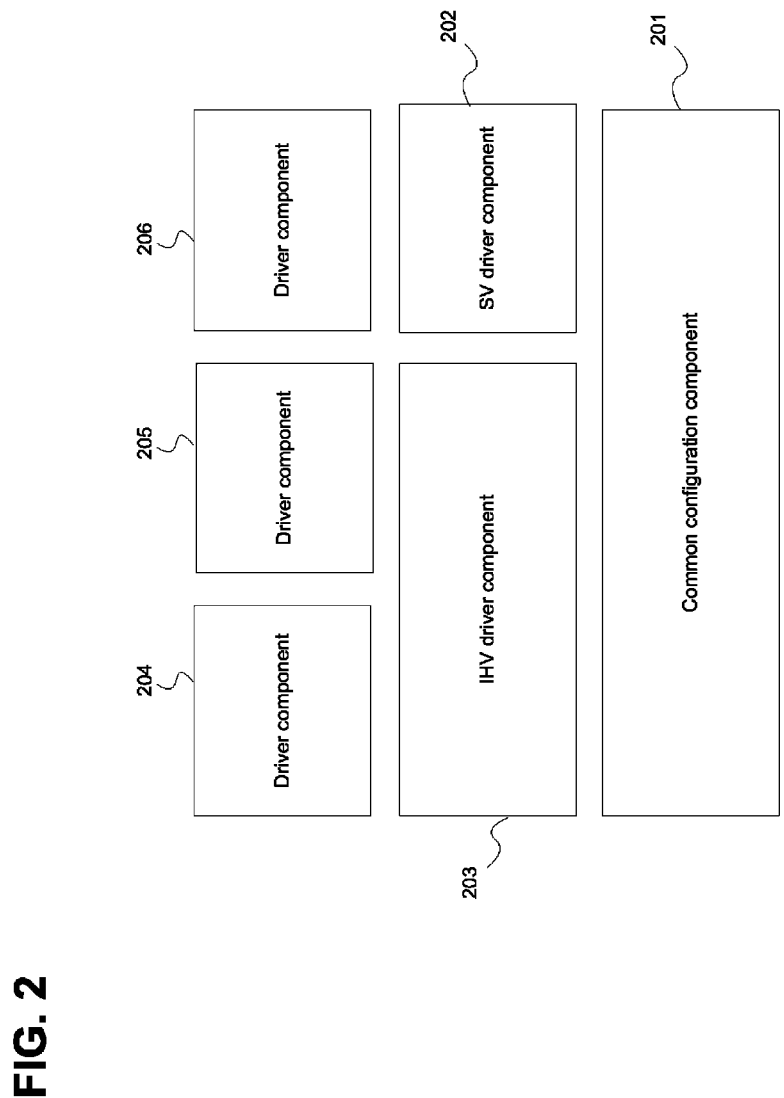
FIG. 2 is a block diagram depicting a printer driver model implemented in accordance with some embodiments of the invention.

An example printer driver model 200 implemented in accordance with some embodiments of the invention is depicted in FIG. 2. In the example printer driver model shown, rendering, configuration and user experience functionality is provided by individual components 201-206 that are arranged in "layers," with a common configuration component 201 that translates information constituting a print job generated by the underlying operating system into PDL format at the "bottom" of the model, and other components 202-205 "sitting atop" the rendering component and providing configuration and user experience functionality. It should be appreciated that the label "component" for elements 201-206 is not necessarily descriptive of a manner in which any or all of components 201-206 are implemented. For example, any or all of components 201-206 may be or comprise standalone drivers, may be or comprise code comprising a portion of a driver, or be or comprise any other suitable collection of information, whether executable on a stand-alone basis or not. Embodiments of the invention are not limited to any particular manner of implementation.

In the example shown in FIG. 2, common configuration component 201 provides information and functions (e.g., helper utilities, files and/or any other suitable information) that may be called by each of higher-level components 202-206. Specifically, while conventional printer driver components are capable of employing information (e.g., files) provided by other components through the use of specific references to that information (e.g., as in printer driver model 100 shown in FIG. 1), the example printer driver model 200 enables higher-level components to employ information provided by an underlying component in a manner which does not make that can make higher-level components vulnerable to changes in the lower-level components. Specifically, in some embodiments of the invention, a higher-level component may take a dependency on a lower-level component (e.g., by specifying the lower-level component in a setup manifest using a directive, and/or using any other suitable technique(s)), and generically reference a set of information provided by the lower-level component. In this respect, taking a dependency is a software development technique whereby a first body of instructions (in this example, a higher-level component) generically references a second body of instructions (in this example, a lower-level component), so that when the first body of instructions is executed, the second body of instructions is instantiated and also executed as if it were part of the first body of instructions. The references within the first body of instructions to the second body of instructions may be resolved at runtime so that the instructions executed are a composite of the first and second bodies of instructions.

When a printer driver employing this model is invoked, the print subsystem of the operating system may resolve references in a higher-level component to a lower-level component at runtime, using information about the lower-level component to create a composite of the lower- and higher-level components, and thereby enabling the functionality provided by both the lower- and higher-level components. Because the model does not require a higher-level component to specifically reference information provided by a lower-level component to use that information, the model allows for modification and adaptation of the lower-level component over time without affecting the manner in which the lower- and higher-level components interoperate.

A composite of higher- and lower-level components may be created in any of numerous ways, as embodiments of the invention are not limited in this respect. For example, some embodiments provide a technique whereby the driver components at the multiple levels are consolidated into a comprehensive DRIVER INFO data structure which includes information from a higher-level component and information from a lower-level component in a single list, or any other suitable collection(s) of information. In some embodiments, file ordering heuristics may be employed to allow the layer from which a particular file originated to be determined. As such, if different files originating at different layers share the same name, the file ordering heuristics may enable each file to be individually identified, enabling the composite driver to function properly.

In the example shown in FIG. 2, common configuration component 201 provides various information (e.g., a set of helper files) used by software vendor (SV) driver component 202 and independent hardware vendor (IHV) driver component 203. The information provided may be of any of numerous types. For example, the information provided by common configuration component 201 may include helper files, utilities, and/or any other form(s) of information. As an example, common configuration componet 201 may provide localized strings describing particular print features (e.g., duplexing, stapling, etc.) for use in the different geographic locations in which a computer employing those features may present information to a user. Any suitable type of information may be provided by common configuration component 201 to either of software vendor (SV) driver component 202 or independent hardware vendor (IHV) driver component 203, as embodiments of the invention are not limited in this respect.

A higher-level component such as software vendor (SV) driver component 202 or independent hardware vendor (IHV) driver component 203 may employ information provided by a lower-level component such as common configuration component 201 in any of numerous ways. For example, information may be employed by a higher-level component through the use of an "include" statement that references information provided by a lower-level component. However, embodiments of the invention are not limited in this respect, as any suitable mechanism(s) or technique(s) may be employed.

Figure 3:
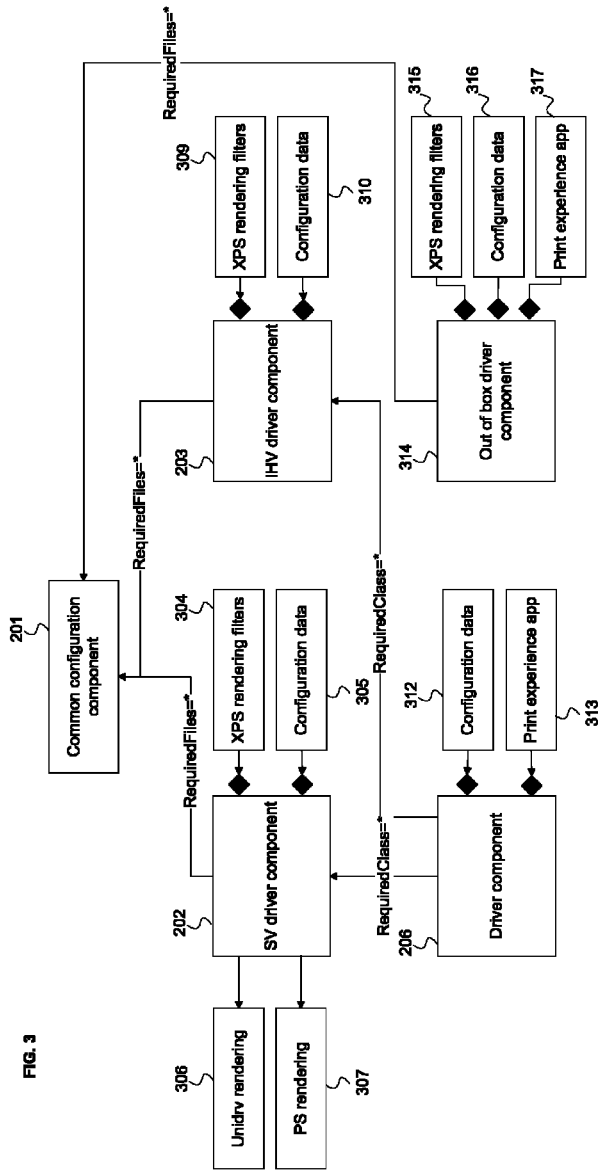
FIG. 3 is unified modeling language (UML) depiction of a printer driver model, implemented in accordance with some embodiments of the invention.

FIG. 3 depicts in greater detail the manner in which higher-level components shown in FIG. 2 may include information used in providing certain print-related functionality, and employ other information provided by lower-level components. In the example of FIG. 3, a higher-level component employs information provided by (e.g., takes a dependency on) a lower-level component by using either a "RequiredFiles=*" or "RequiredClass=*" reference to information provided by the lower-level component, to provide print-related functionality. However, it should be appreciated that any of numerous mechanisms and/or techniques may be employed by a higher-level component to use information provided by a lower-level component, as embodiments of the invention are not limited in this respect.

In the example shown in FIG. 3, SV driver component 202 uses included and referenced information to provide rendering functionality. Specifically, SV driver component 202 includes information 306 and 307 (providing rendering functionality using the Unidrv renderer and PostScript (PS) renderers, respectively) and employs information provided by common configuration component 201 (i.e., element 304, providing XPS rendering filters for use in rendering in the XPS PDL) via a "RequiredFiles=*" reference to information provided by common configuration component 201. A "RequiredFiles=*" reference may, for example, list one or more referenced files and/or data structures, such as in a comma-delimited list, or in any other suitable manner. In the example shown, SV driver component 202 also employs configuration data 305 provided by common configuration component 201, to provide configuration functionality. Any of numerous types of information provided by a lower-level component may be employed by a higher-level component, as embodiments of the invention are not limited in this respect.

By contrast, IHV driver component 203 does not get information providing rendering functionality in the Unidrv or PostScript modules from common configuration component 201. Rather, IHV driver component includes XPS rendering filters 309 and configuration data 310. Driver component 203 may, for example, be configured for use with printer devices that use the XPS PDL.

Device driver component 206 takes a dependency from either of SV driver component 202 and IHV driver component 203 (in the example shown, via "RequiredClass=*" references to each of SV driver component 202 and IHV driver component 203). In some embodiments, a "RequiredClass=*" reference allows a higher-level component to a dependency on a lower-level component to take advantage of information provided by the lower-level component (e.g., to support rendering and/or configuration functionality) without the higher-level component having detailed knowledge of the lower-level component. It should be appreciated that embodiments of the invention are not limited to employing a "RequiredClass=*" reference for this purpose, as any suitable mechanism(s) and/or technique(s) may alternatively be employed.

In the example shown, while device driver component 206 includes configuration data 312 and print experience app 313, it takes a dependency on either SV driver component 202 to provide rendering functionality in the XPS, Unidrv, PostScript renderers(s)), or on IHV driver component 203 to provide rendering functionality in the XPS PDL. Of course, a higher-level component may employ information provided by a lower-level component in any of numerous forms, to provide any of numerous types of print-related functionality, as embodiments of the invention are not limited in this respect.

In the example shown in FIG. 3, out-of-box driver 314 does not take a dependency from either of driver components 202 or 203. Instead, out-of-box driver 314 takes a dependency directly from common configuration component 201. Out-of-box driver 314 illustrates that a driver not adapted for a multi-layer model wherein rendering, configuration and user experience functionality are provided by separate components, may be employed.

Referring again to FIG. 2, in the example printer driver model 200 shown, each of driver components 202 and 203 is designed to provide functionality usable by a population ("class") of devices. A class may be defined by any one or more shared characteristics, features and/or qualities. For example, a class may be defined by the use by each device in the class of a particular PDL, by a shared set of features and/or parts, and/or any one or more other characteristics.

In example printer driver model 200, each of driver components 204, 205 and 206 takes a dependency from one of driver components 202 or 203. Specifically, in the example shown, driver component 204 takes a dependency from SV driver component 202, and each of driver components 205, 206 takes a dependency from IHV driver component 203. By taking a dependency from a lower-level driver component, each of driver components 204, 205 and 206 may employ information provided by a lower-level component, in much the same manner as driver components 202, 203 employ information provided by common configuration component 201.

In the example printer driver model 200 shown, each of driver components 204, 205 and 206 provides functionality for use by a specific device. Thus, driver component 204 supports one device, driver component 205 supports another device, and driver component 206 supports yet another device. It should be appreciated that although the example printer driver model 200 shown in FIG. 2 includes device-specific driver components in the third "layer," a printer driver model implemented in accordance with embodiments of the invention may include any suitable number of layers. For example, a printer driver model may include multiple layers of class driver components and/or device-specific driver components, such that the total number of layers is greater than the three that are shown in FIG. 2. Conversely, a printer driver model may include less layers than are shown in FIG. 2. For example, a driver component designed to support a single device may take a dependency on common configuration component 201, so that only two layers are used to support the device (an example of this is driver component 314, shown in FIG. 3). In addition, a printer driver model may have different numbers of layers for different devices. For example, four layers of driver components may be used to support one device, and two may be used to support another. Any suitable number of layers, each designed to support any suitable number of devices, may be employed, as embodiments of the invention are not limited in this respect.

It should also be appreciated that configuration and/or user experience functionality may be provided by driver components sitting at any one or more layers within the printer driver model. Using the example printer driver model 200 shown in FIG. 2 to illustrate, configuration functionality for a printer device supported by driver component 206 may be provided by driver component 206, IHV driver component 203, or some combination thereof (e.g., a portion of the configuration functionality for the device may be provided by driver component 206, and the remainder by IHV driver component 203). Similarly, user experience functionality for a printer device supported by driver component 205 may be provided by driver component 205, THY driver component 203, or some combination thereof. Any set of functionality may be provided by any suitable number of components, as embodiments of the invention are not limited in this respect.

It should further be appreciated that a printer driver model implemented in accordance with embodiments of the invention allows for flexibility with respect to driver component suppliers. Using the example shown in FIG. 2 to illustrate, a software vendor (e.g., maker of the operating system under which a printer driver embodying aspects of the invention is designed to operate) may, for example, supply common configuration component 201, a first hardware vendor may supply driver components 203 and 206, etc. Any suitable entity may provide any one or more driver components.

Figure 4:
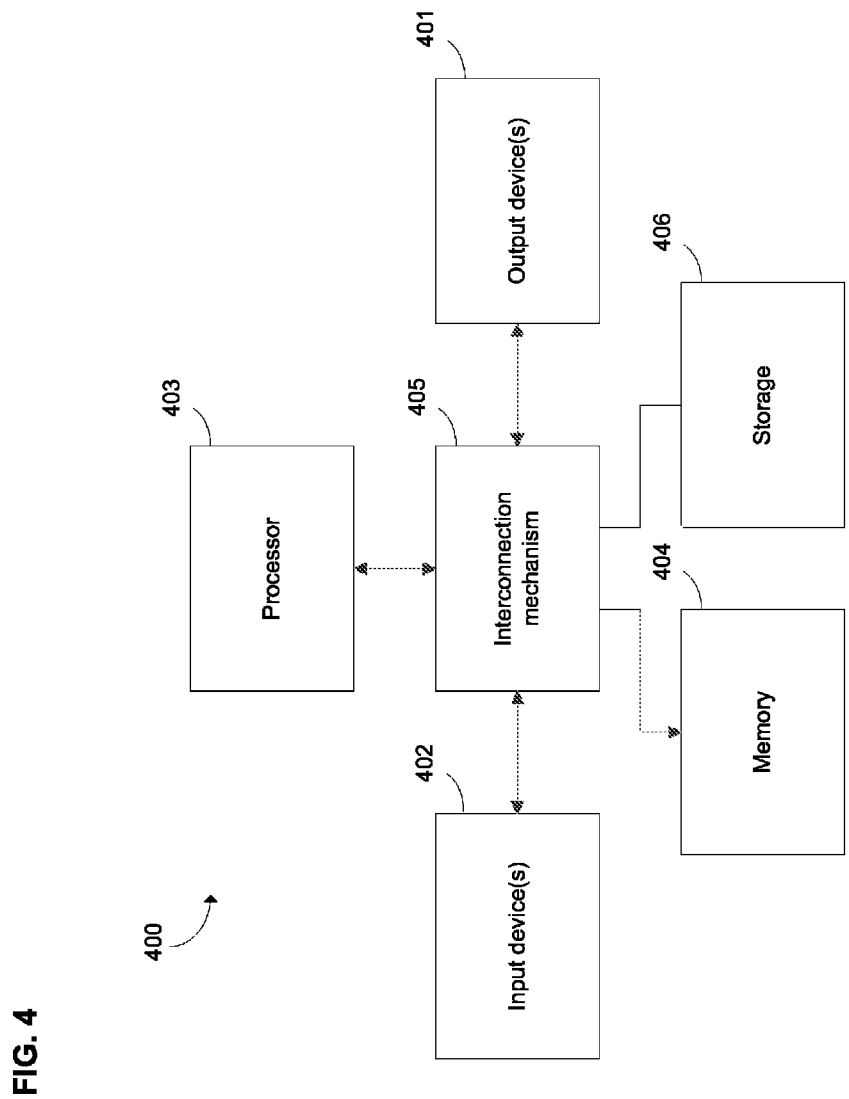
FIG. 4 is a block diagram depicting an example computer which may be employed to implement some embodiments of the invention.

Various aspects of the systems and methods for practicing features of the present invention may be implemented on one or more computer systems, such as the exemplary computer system 400 shown in FIG. 4. Computer system 400 includes input device(s) 402, output device(s) 401, processor 403, memory system 404 and storage 406, all of which are coupled, directly or indirectly, via interconnection mechanism 405, which may comprise one or more buses, switches, networks and/or any other suitable interconnection. The input device(s) 402 receive(s) input from a user or machine (e.g., a human operator), and the output device(s) 401 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 403 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and data-flow control. Collectively, the processor and operating system define the computer platform for which application programs and other computer program languages are written.

Processor 403 may also execute one or more computer programs to implement various functions. These computer programs may be written in any type of computer program language, including a procedural programming language, object-oriented programming language, macro language, or combination thereof. These computer programs may be stored in storage system 406. Storage system 406 may hold information on a volatile or non-volatile medium, and may be fixed or removable. Storage system 406 is shown in greater detail in FIG. 5.

Storage system 406 may include a tangible computer-readable and writable non-volatile recording medium 501, on which signals are stored that define a computer program or information to be used by the program. The recording medium may, for example, be disk memory, flash memory, and/or any other article(s) of manufacture usable to record and store information. Typically, in operation, the processor 403 causes data to be read from the nonvolatile recording medium 501 into a volatile memory 502 (e.g., a random access memory, or RAM) that allows for faster access to the information by the processor 403 than does the medium 501. The memory 502 may be located in the storage system 406 or in memory system 404, shown in FIG. 4. The processor 403 generally manipulates the data within the integrated circuit memory 404, 502 and then copies the data to the medium 501 after processing is completed. A variety of mechanisms are known for managing data movement between the medium 501 and the integrated circuit memory 404, 502, and the invention is not limited to any mechanism, whether now known or later developed. The invention is also not limited to a particular memory system 404 or storage system 406.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof.

It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A tangible, computer-readable storage medium having instructions encoded thereon which, when executed, performs a method of enabling a computer to drive a printer device, the method comprising:
   providing, via a first component, rendering functionality whereby information constituting a print job is formatted according to a page description language which the printer device is configured to process;
   providing configuration and user experience functionality via at least one second component separate from the first component, the configuration functionality enabling provision of information relating to a configuration of the printer device to a user of the computer, the user experience functionality enabling provision of information relating to printing to be displayed to the user, the at least one second component referencing the first component such that, when an instruction is received to print using the printer device, a composite of the first component and the at least one second component is created to control printing by the printer device.

2. The tangible, computer-readable storage medium of claim 1, wherein the computer executes an operating system offered by a software vendor, and wherein the first component is provided by the software vendor.

3. The tangible, computer-readable storage medium of claim 1, wherein the computer executes an operating system comprising a print subsystem, and wherein the first component is integrated with the print subsystem.

4. The tangible, computer-readable storage medium of claim 1, wherein the at least one second component is provided by a hardware vendor that makes the printer device.

5. The tangible, computer-readable storage medium of claim 1, wherein reference by the at least one second component to the first component comprises a dependency taken by the at least one second component on the first component.

6. The tangible, computer-readable storage medium of claim 5, wherein the dependency comprises the at least one second component specifying the first component in a setup manifest of the at least one second component using a directive.

7. The tangible, computer-readable storage medium of claim 5, wherein the at least one second component comprises a third component and a fourth component, the third component taking a dependency from the first component, the fourth component taking a dependency from the third component.

8. The tangible, computer-readable storage medium of claim 6, wherein the third component provides configuration functionality and the fourth component provides user experience functionality.

9. The tangible, computer-readable storage medium of claim 1, wherein each at least one second component enables configuration and/or user experience functionality by a population of printer devices which includes but is not limited to the printer device.

10. The tangible, computer-readable storage medium of claim 9, wherein the population of devices is defined by a characteristic shared by each printer device in the population, the characteristic comprising the use of a particular component or the use of a particular page description language.

11. The tangible, computer-readable storage medium of claim 1, wherein the composite comprises a data structure that incorporates information taken from the first component and the at least one second component, the incorporation of the information employing file ordering heuristics governing a component from which to source information if the information is available from more than one component.

12. The tangible, computer-readable storage medium of claim 1, wherein the at least one second component is a single component that provides both configuration and user experience functionality.

13. A method of enabling a computer to drive a printer device, comprising:
   defining a printer driver model in which a first driver component and a second driver component each provide functionality relating to interoperation of the computer and the printer device, the first component providing rendering functionality whereby information constituting a print job is formatted according to a page description language which the printer device is configured to process, the second component providing configuration functionality whereby an indication of a configuration of the printer device is provided to a user of the computer, the second component referencing the first component in a manner so that, when an instruction to print using the printer device is received, a composite of the first component and the second component is created to control printing by the printer device.

14. The method of claim 13, wherein the referencing by the second component comprises the second component taking a dependency on the first component.

15. The method of claim 14, wherein the dependency comprises the second component specifying the first component in a setup manifest of the second component using a directive.

16. The method of claim 13, wherein the printer driver model includes a third component that provides user experience functionality whereby information relating to printing by the printing device is displayed to the user, the third component taking a dependency on the second component.

17. The method of claim 13, wherein the second component enables configuration functionality by a population of printer devices that includes but is not limited to the printer device.

18. A computer, in networked communication with a printer device, the computer comprising at least one processor programmed to:

provide, via a first component, rendering functionality whereby information constituting a print job is formatted according to a page description language which the printer device is configured to process;

provide configuration functionality via a second component separate from the first component, the configuration functionality enabling provision of information relating to a configuration of the printer device to a user of the computer, the at least one second component referencing the first component such that, when an instruction is received to print using the printer device, a composite of the first component and the at least one second component is created to control printing by the printer device.

19. The computer of claim 18, wherein the at least one processor is programmed to provide, via a third component, user experience functionality whereby information relating to printing by the printing device is displayed to the user, the third component referencing the second component so that when an instruction to print is received, a composite of the first, second and third components is created to control printing by the printer device.

20. The computer of claim 18, wherein the second component enables configuration functionality by a population of printer devices which includes but is not limited to the printer device.

* * * * *